United States Patent
Proulx et al.

(10) Patent No.: US 7,487,240 B2
(45) Date of Patent: Feb. 3, 2009

(54) CENTRALIZED INTERNET PROTOCOL/MULTI-PROTOCOL LABEL SWITCHING CONNECTIVITY VERIFICATION IN A COMMUNICATIONS NETWORK MANAGEMENT CONTEXT

(75) Inventors: Denis Armad Proulx, Kanata (CA); Craig Ellirt Timmerman, Ottawa (CA); Felix Katz, Ottawa (CA); Margaret Rachinowski, Nepean (CA); Afshan Zabihi, Kanata (CA); Macmohana Singh Virdy, Ottawa (CA)

(73) Assignee: Alcatel Lucent, Paris (FR)

( * ) Notice: Subject to any disclaimer, the term of this patent is extended or adjusted under 35 U.S.C. 154(b) by 838 days.

(21) Appl. No.: 10/820,111

(22) Filed: Apr. 8, 2004

(65) Prior Publication Data
US 2005/0022189 A1 Jan. 27, 2005

(30) Foreign Application Priority Data
Apr. 15, 2003 (CA) ................................. 2425442

(51) Int. Cl.
*G06F 15/173* (2006.01)
(52) U.S. Cl. ........................ 709/224; 709/223; 709/220
(58) Field of Classification Search ................. 709/220, 709/223, 224
See application file for complete search history.

(56) References Cited

U.S. PATENT DOCUMENTS

| | | | |
|---|---|---|---|
| 5,974,237 A | 10/1999 | Shurmer | |
| 6,031,528 A * | 2/2000 | Langfahl, Jr. | 709/224 |
| 6,205,122 B1 | 3/2001 | Sharon | |
| 6,222,827 B1 | 4/2001 | Grant | |
| 6,298,043 B1 * | 10/2001 | Mauger et al. | 370/248 |
| 6,397,248 B1 | 5/2002 | Iyer | |
| 6,405,248 B1 * | 6/2002 | Wood | 709/223 |
| 6,494,831 B1 * | 12/2002 | Koritzinsky | 600/301 |
| 6,502,130 B1 | 12/2002 | Keeler, Jr. | |
| 6,581,166 B1 * | 6/2003 | Hirst et al. | 714/4 |
| 6,615,276 B1 * | 9/2003 | Mastrianni et al. | 709/220 |
| 6,636,898 B1 * | 10/2003 | Ludovici et al. | 709/227 |
| 6,646,564 B1 * | 11/2003 | Azieres et al. | 340/679 |
| 6,694,367 B1 * | 2/2004 | Miesbauer et al. | 709/227 |
| 6,760,767 B1 * | 7/2004 | Miesbauer et al. | 709/227 |
| 6,965,572 B1 * | 11/2005 | Boodaghians | 370/249 |
| 7,124,183 B2 * | 10/2006 | Pekary et al. | 709/224 |
| 7,162,250 B2 * | 1/2007 | Misra | 455/453 |
| 7,194,538 B1 * | 3/2007 | Rabe et al. | 709/224 |
| 2004/0162781 A1 * | 8/2004 | Searl et al. | 705/51 |

\* cited by examiner

*Primary Examiner*—Philip B Tran

(57) ABSTRACT

A framework for connectivity verification is provided. The framework includes a connectivity verification server performing unattended connectivity verification, and a connectivity verification application, both the connectivity verification server and connectivity verification application operating in a network management context. Connectivity verification jobs are defined via the connectivity verification application and the connectivity verification server is configured accordingly. Connectivity verification jobs can also be scheduled. The connectivity verification application also provides a display of connectivity verification results. The results of each connectivity verification job may be compared against a desired connectivity profile and deviations from the connectivity profile being used to raise alarms. Connectivity verification results, including alarm information, are further used to highlight displayed managed communications network entities on a network map displaying selected connectivity verification results. The advantages are derived from using the connectivity verification framework to automate connectivity verification testing at reduced operational costs.

19 Claims, 13 Drawing Sheets

CENTRALIZED INTERNET PROTOCOL/MULTI-PROTOCOL LABEL SWITCHING CONNECTIVITY VERIFICATION IN A COMMUNICATIONS NETWORK MANAGEMENT CONTEXT

FIELD OF THE INVENTION

The invention relates to communications network management and service provisioning, and in particular to methods and apparatus for centralized Internet Protocol/Multi-Protocol Label Switching connectivity verification in a communications network managed context ensuring adherence to service level agreements.

BACKGROUND OF THE INVENTION

In the field of Internet Protocol (IP)/Multi-Protocol Label Switching (MPLS) communications, it is known to verify whether two data network nodes can reach each other by employing functionality provided by a "ping" command and a "traceroute" command. The implementation of the ping and traceroute commands functionality specification are described in Internet Engineering Task Force Request For Comments (RFC) 1147 which is incorporated herein by reference. A short summary of the relevant concepts of the ping and traceroute commands follows:

Persons of ordinary skill in the art would understand that data communications networks conveying data packets in accordance with the IP protocol and/or the MPLS protocol do so in accordance with a store and forward discipline. At each data network node in a communications network, a packet is received via an input port, stored, an output port determined in real-time, and the packet is forwarded over the determined output port. Real-time port determination is known as routing functionality and is performed by a router network element. The real-time determination of the output port is made dependent on a variety of factors including: destination addressing information held in packet headers, forwarding class associativity, packet traffic differentiation, operational states of interconnecting links between network nodes, transport bandwidth availability over links, packet processing bandwidth availability at data network nodes in the path, etc.

Persons of ordinary skill in the art would understand that data communications networks conveying data packets in accordance with the IP protocol, do so in accordance with a best-effort packet transport discipline. The best-effort discipline does not guarantee that data packets will reach their destinations, does not guarantee bounded packet arrival latencies, does not guarantee bounded packet arrival jitter, etc. In fact packets specifying the same source network address and the same destination network address do not necessarily follow the same transport path in a data communications network, which is known in the art as loose source routing.

The real-time output port determination described above may lead to situations in which packet transport loops are established. Each IP packet carries a Time-To-Live (TTL) specification in its header, which is an integer header field value initially set by a source data network node sending the packet (or a gateway at an edge between a customer network and a service provider network) and decremented by each data transport node forwarding the packet. When the TTL value reaches zero (0), the packet is discarded.

Although simple, this approach puts a lot of pressure on IP network design to ensure that only a small number of data transport nodes, and therefore interconnecting links, are traversed between a source data network node and a destination data network node. Physical implementations of interconnecting links varies and may include additional data/packet transport protocols—therefore from the point of view of connectivity verification, the data communications network infrastructure between two interfaces on two corresponding data transport nodes is referred to as a "hop" to make an abstraction thereof.

As mentioned herein above, the best-effort packet transport discipline does not guarantee bound packet arrival latencies. Latency is the amount of time it takes for a packet to traverse a communications network from its source data network node to its destination data network node. Latency is typically measured in milliseconds and includes physical data transport delays associated with physically conveyance of packets over physical interconnecting links, as well packet processing delays incurred by packets while being stored at transport network nodes, in a transport path between the source network node and the destination network node, while pending determination of output ports.

As mentioned herein above, the best-effort packet transport discipline does not guarantee a bound packet arrival jitter. Jitter is a measure of the variation of packet inter-arrival delays, and relates to a measure of the standard deviation of a group of delays incurred by a group of individual data packets typically associated with a data stream used in provisioning a data service.

The service provisioning, which is beyond the scope of the present description, is dependent on the resultant Quality-of-Service provided. Quality-of-Service is a combination of bandwidth, arrival delay, and jitter specifications for a particular data service provisioned end-to-end over a given interconnecting communications network infrastructure.

A person skilled in the art would understand that the MPLS transport protocol has been developed in order to provide high Quality-of-Service packet transport. Although, delays associated with physical packet propagation over physical interconnecting links can only be reduced to a certain extent, the MPLS technology provides: bandwidth reservation on the interconnecting links to ensure a resource availability, strict (pre-specified) routing/transport path to minimize packet processing delays along the path, and consolidated multi-transport layer switching minimizing switching delays at switching network nodes in the path. Packets having the same source network address and the same destination network address may follow different transport paths dependent on a Service Level Agreement (SLA) specification for each packet.

It is the adherence to a service level agreement in an MPLS environment, and the need to adhere to a service level agreement specification in a best-effort IP environment that is being addressed in the present description.

The implementation of ping and traceroute functionality includes the return conveyance of at least one individual echo return Internet Control Message Protocol (ICMP) packet, a packet probe, in a data communication network between a source network node and a destination network node to verify connectivity therebetween.

The extent to which connectivity is verified by ping probe packets relates to reachability, see FIG. 1. Ping probe packets carry a TTL value, and therefore reachability includes: an assessment as to whether there is at least one bound sequence of interconnecting links which can be traversed by a packet conveyed between the source network node and the destination network node before the expiration of the TTL. It is emphasized that each ping probe packet tests connectivity between a pair of pre-specified source and destination network nodes.

Besides testing reachability, each ping probe packet is also stamped with a time stamp value corresponding to the time at which the ping probe packet was issued by the source network node, enabling the calculation the aggregate return transport delay upon the return of the ping probe packet at the source network node. In sending a group of ping probe packets, the corresponding group of aggregate return transport delays are used to determine: minimum delay, maximum delay, average delay (in milliseconds), and jitter. The determined minimum delay, maximum delay, average delay, and jitter are referred to as packet transport statistics.

The extent of connectivity verification performed by employing traceroute packets, as they are known, relates network node discovery in a path between a source to a destination network node, FIG. 2. Implementing traceroute functionality employs groups of ICMP echo return packets directed towards the destination network node and bearing increasing TTL values. Traceroute packets are returned to the source network node when the TTL value is decremented to zero, therefore the use of increasing TTL values in sending the traceroute packets discovering intermediary transport network nodes incrementally further along a path between the source network node and the destination node.

Making reference to FIG. 3, for a source routed Label Switched Path (LSP) pre-established path, physical network nodes incrementally further along the LSP transport path may not return traceroute packets as the traceroute packets are encapsulated while in transport through the LSP, the TTL value only being decremented at the distal end of the LSP which does return traceroute packets. Traceroute packets are of course returned by network nodes beyond the distal end of the LSP.

In a best-effort IP environment, it cannot be guaranteed that all traceroute packets are routed the same as packet processing conditions change dynamically at network nodes between the source and the destination network nodes. A degree of stability in a communications network is expected, although not guaranteed, which when traceroute packets are sent in a relatively rapid succession, results in the group of traceroute packets following substantially the same transport path.

Information held in returned traceroute packets is used to extract transport delay information. Statistical information is derived from successive sequences of traceroute packets. Therefore transport delay and jitter profiles can be provided for each determined transport path between a pair of network nodes in a communications network. The extent to which these delay and jitter profiles can be used to derive per-hop statistics is left to higher level applications interpreting the statistical information, higher level applications which are beyond the scope of the present description.

Having provided an overview of ping and traceroute functionality, it is important to emphasize that, ping and traceroute packets are sent from a source network node and returned to the same source network node. The resulting statistics are also made available by, and at, the source network node.

Service providers include organizations and communications network infrastructure providing communications services to customers. Services include best-effort packet transport, MPLS packet transport, as well differentiated services such as Virtual Local Area Networking (VLAN) in support of Virtual Private Network (VPN) connectivity.

Currently service providers make extensive use of ping and traceroute functionality to verify connectivity on a very limited basis. Typically operations management personnel needs to physically and manually log-in on each remote source network node via a Command Line Interface (CLI), issue necessary ping and/or traceroute commands from a prompt specifying network node addressing manually, capture the output of the console, and retrieve the output from the remote source network node.

In service provider managed communications network it is more important to verify connectivity between individual routers. Routers include physical router communications network nodes as well virtual routers associated with switching communications network nodes. Referring to FIG. 4, five fully meshed routers R1, R2, R3, R4 and R5 are shown providing VPN services VPN1 and VPN2. Connectivity verification for VPN1 between Location 1 and Location 3 can be performed manually in two steps: ping/traceroute test T1 is run from R1 towards R3 and a second ping/traceroute test T2 is run from R3 towards R1. Each time a ping/traceroute test is run, the operator has to log-in on the source router, run the ping/traceroute test, and retrieve the results.

If connectivity verification is required between all peer routers in VPN1 more test steps would be required: ping/traceroute test T3 verifies connectivity from Location 2 to Location 3, another ping/traceroute test would be necessary to verify connectivity to Location 3 from Location 2, another two ping/traceroute tests would have to be done between Location 1 and Location 2.

The operator has to perform more ping/traceroute tests for the other VPNs such as VPN2 between Location 2 and Location 4.

In performing connectivity verification in two separate steps between each pair of locations, it is not obvious to operations management personnel which router IP address and VLAN IDentifier (VPN1/VPN2) to use from which router. This level of operator involvement is inadequate as CLI command entry is a very time consuming, complex, and error prone procedure leading to large operational overheads incurred by service providers. In particular, manual command entry makes is impossible and untimely for connectivity verification to be performed in an environment in which a large number of customers subscribing to a corresponding large number of VPNs serviced by a service provider using an infrastructure of a large number of communications network nodes interconnected via a large number of links. Meaningful statistics need be derived from a large number of ping/traceroute tests performed in a relatively short period of time.

Packet traffic patterns vary over a period of time and are typically cyclical over the time of a day and cyclical over a week. Therefore it is important to both customers and service providers that connectivity verification be performed during peak hours (business hours and evenings) and peek weekdays (workdays and weekends). Therefore it is apparent that if manually directed connectivity verification is time consuming, then manual connectivity verification within test windows would be impossible due to overwhelming operational overheads involved. The number of connectivity verification tests grows with the number of location combinations for each VPNs making connectivity verification even more complex and time consuming.

The closest prior art relates to network topology discovery and includes:

A prior art U.S. Pat. No. 6,502,130 B1 entitled "System and Method for Collecting Connectivity Data of an Area Network" which issued on Dec. 31, 2002 to Keeler, Jr. et al. describes a system and method which collects dynamic connectivity data from an area network interconnecting multiple computing devices. The dynamic connectivity information is combined in a data warehouse with static network information, relating to the various users and their privileges. The combined data stored in a data warehouse permits the identification of each user and the various privileges of the user, correlated by connection port. The connectivity data is collected using commands in the simple network management protocol (SNMP). SNMP commands query all network devices such as hubs, routers, and gateways to other networks to obtain port connectivity information such as the identity of the ports being used by each network user. Although inventive, the solution proposed by Keeler Jr. et al. only achieves Open Systems Interconnect (OSI) Layer 2 and 1 connectivity discovery in support of billing applications for users subscribing to roaming network access services. Keeler Jr. et al. do not address issues related to ensuring adherence to service level agreements in real-time.

A prior art U.S. Pat. No. 6,205,122 B1 entitled "Automatic Network Topology Analysis" which issued on Mar. 20, 2001 to Sharon et al. describes a system and method for automatic detection of physical network topology, by correlating information from computers connected to a network. Although inventive, the solution presented by Sharon et al. does not address issues related to ensuring adherence to service level agreements in real-time.

A prior art U.S. Pat. No. 6,397,248 B1 entitled "System and Method to Discover End Node Physical Connectivity to Networking Devices" which issued on May 28, 2002 to Iyer describes an apparatus and method for determining physical connectivity between end nodes and networking devices within a network. Iyer addresses issues related to the SNMP protocol's inability to ascertain the physical connection between end nodes and networking devices. Although inventive, the solution presented by Iyer does not address issues related to ensuring adherence to service level agreements in real-time.

A prior art U.S. Pat. No. 6,405,248 B1 entitled "Method and Apparatus for Determining Accurate Topology Features of a Network" which issued on Jun. 11, 2002 to Wood describes a method for determining accurate topology features of a given network utilizing source address tables. The solution proposes acquiring source address table information from each port of each network switching node at regular intervals to determine when a particular source address was learned and when discarded. The source address information is used to issue Address Resolution Protocol (ARP) queries to ensure that the source address information is valid. While inventive, the solution presented by Wood does not address issues related to ensuring adherence to service level agreements in real-time.

A prior art U.S. Pat. No. 5,974,237 entitled "Communications Network Monitoring" which issued on Oct. 26, 1999 to Shurumer et al. describes a proprietary method for monitoring a communications network comprising a plurality of node equipment such as switches, and link equipment such as fiber optic links in which proprietary performance parameters of individual vendor specific components of the node equipment are used to determine an overall proprietary performance parameter for the node equipment. By comparing like proprietary performance parameters for individual network elements, the performance of different types of proprietary network elements can be compared with each other. Parameters which can be monitored include quality of service, cell discard, cell loss, and other measures of network performance. Connection tracing through the plurality of node equipment and link equipment is used employing proprietary means to provide topology discovery. While inventive, the solution presented by Shurumer et al. does not address issues related to ensuring adherence to service level agreements in real-time.

Other developments include, a prior art U.S. Pat. No. 6,222,827 B1 entitled "Telecommunications Network Management System" which issued on Apr. 24, 2001 to Grant et al. which describes a system for managing a Synchronous Digital Hierarchy (SDH) network and proposes the tracking and processing of network related data in support of specifying connectivity parameters for establishing data pipes. The solution relates to a network management system which forms an overall view of the network and its condition, from which the system gives configuration commands to each transmission equipment so that all configuration changes can be performed significantly more rapidly. While inventive, the solution presented by Grant et al. does not address issues related to ensuring adherence to service level agreements in real-time.

Reducing operating expenditures is important service providers. Addressing these concerns is especially important in large and complex service provider IP/MPLS communications networks. There therefore is a need to solve the above mentioned issues.

SUMMARY OF THE INVENTION

In accordance with an aspect of the invention, a framework for connectivity verification is provided. The framework includes a connectivity verification server performing unattended connectivity verification, and a connectivity verification application, both the connectivity verification server and connectivity verification application operating in a network management context.

In accordance with another aspect of the invention, connectivity verification jobs are defined via the connectivity verification application and the connectivity verification server is configured accordingly.

In accordance with a further aspect of the invention, connectivity verification jobs are scheduled and the connectivity verification server performs scheduled connectivity verification.

In accordance with a further aspect of the invention, the connectivity verification application also provides a display of connectivity verification results.

In accordance with a further aspect of the invention, the results of each connectivity verification job may be compared against a desired connectivity profile and deviations from the connectivity profile may be used to raise alarms.

In accordance with yet another aspect of the invention, connectivity verification results, including alarm information, are further used to generate a network map displaying selected connectivity verification results.

The advantages are derived from using the framework to perform unattended scheduled connectivity verification at reduced operational costs.

BRIEF DESCRIPTION OF THE DRAWINGS

The features and advantages of the invention will become more apparent from the following detailed description of the preferred embodiment(s) with reference to the attached diagrams wherein.

It will be noted that in the attached diagrams like features bear similar labels.

DETAILED DESCRIPTION OF THE EMBODIMENTS

Figure 1:
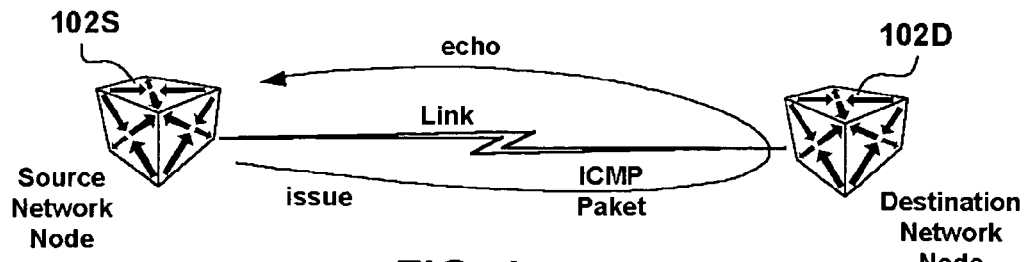
FIG. 1 is a schematic diagram showing a ping connectivity verification test being performed manually between a source and destination node.
Figure 2:
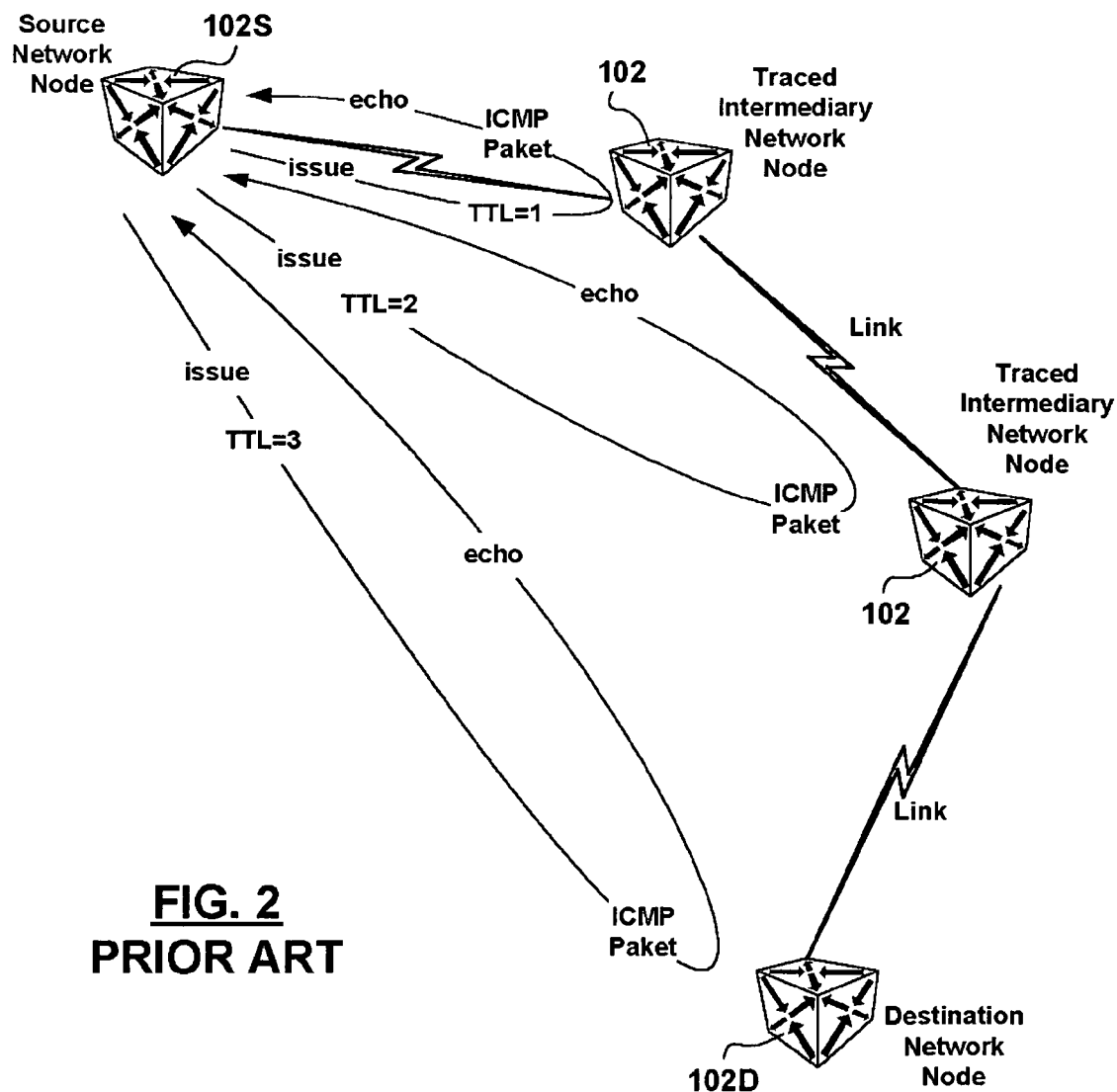
FIG. 2 is a schematic diagram showing a traceroute connectivity verification test being performed manually between a source and destination node.
Figure 3:
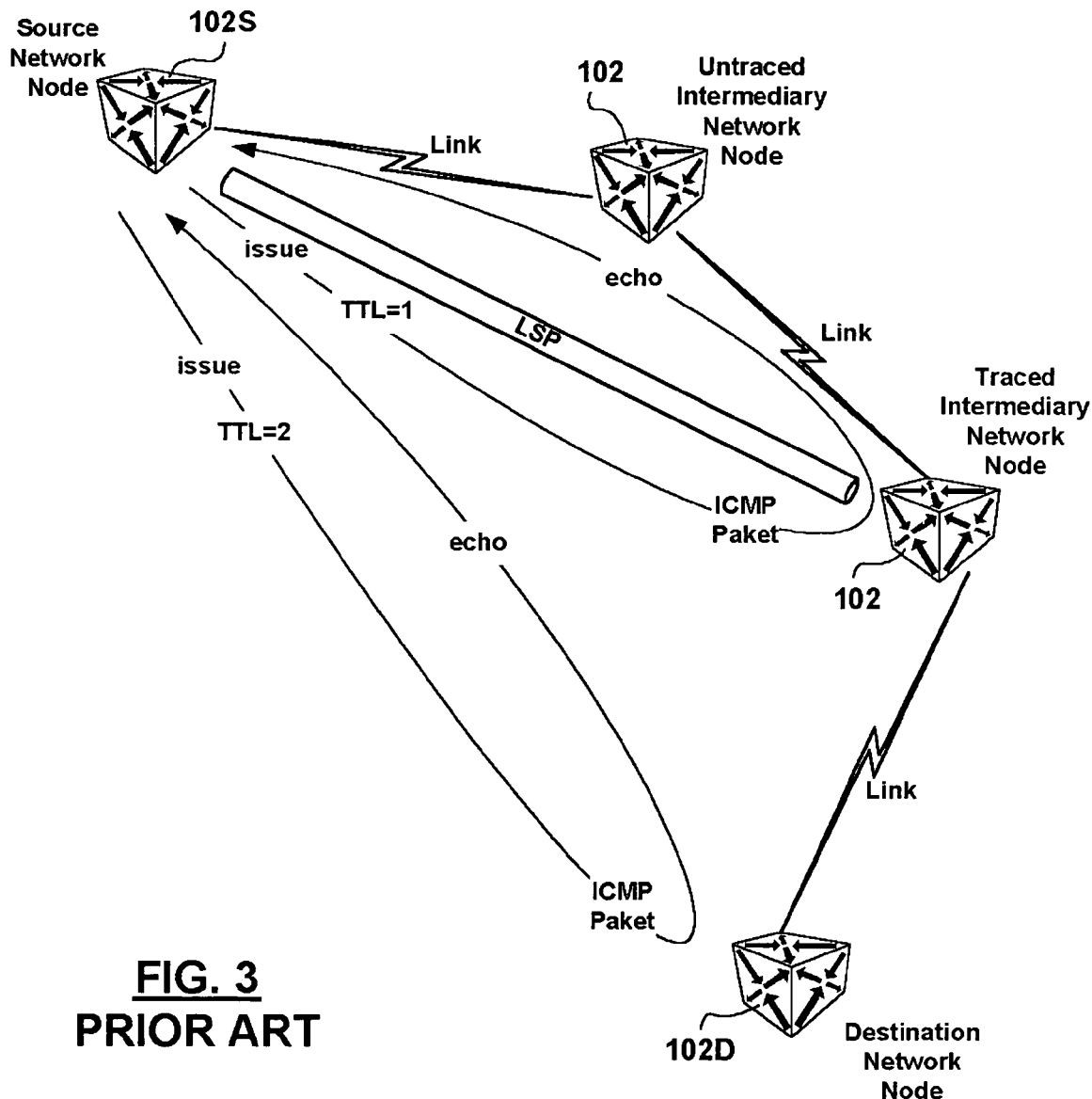
FIG. 3 is a schematic diagram showing a traceroute connectivity verification test being performed manually between a source and a destination node via an LSP.
Figure 4:
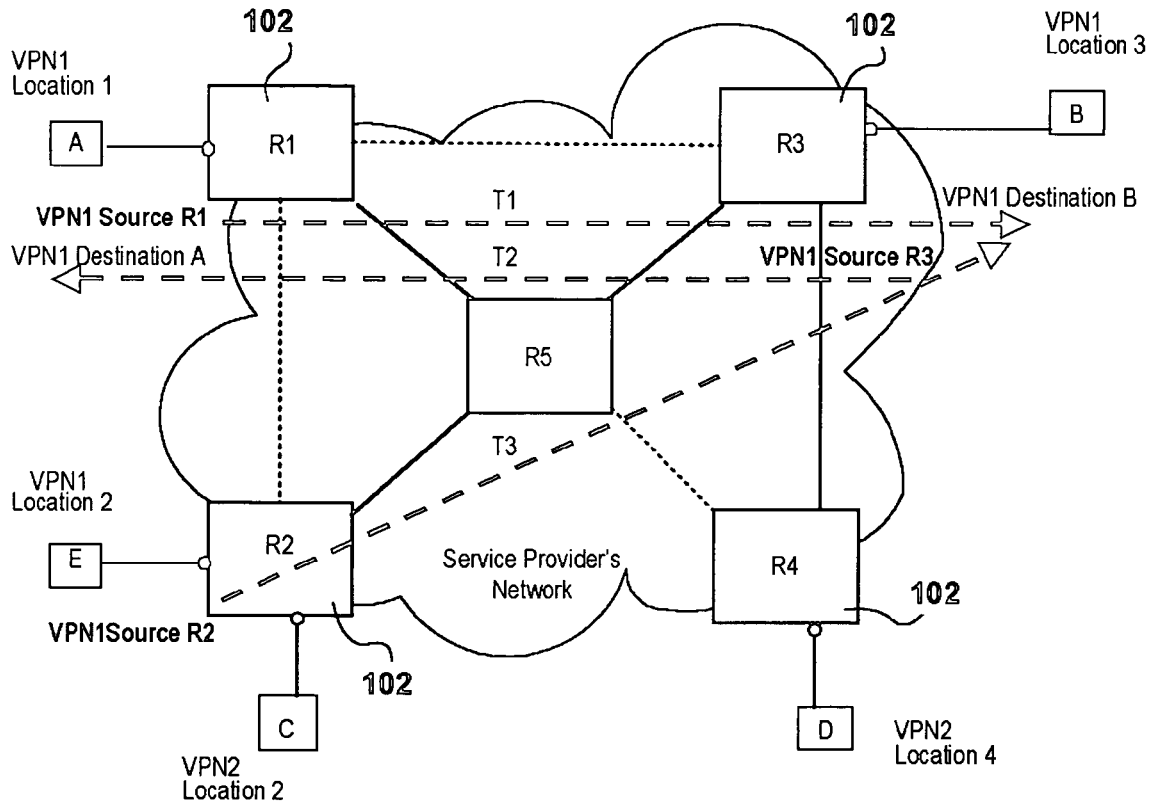
FIG. 4 is a schematic diagram showing prior art manual virtual private networking connectivity verification.
Figure 5:
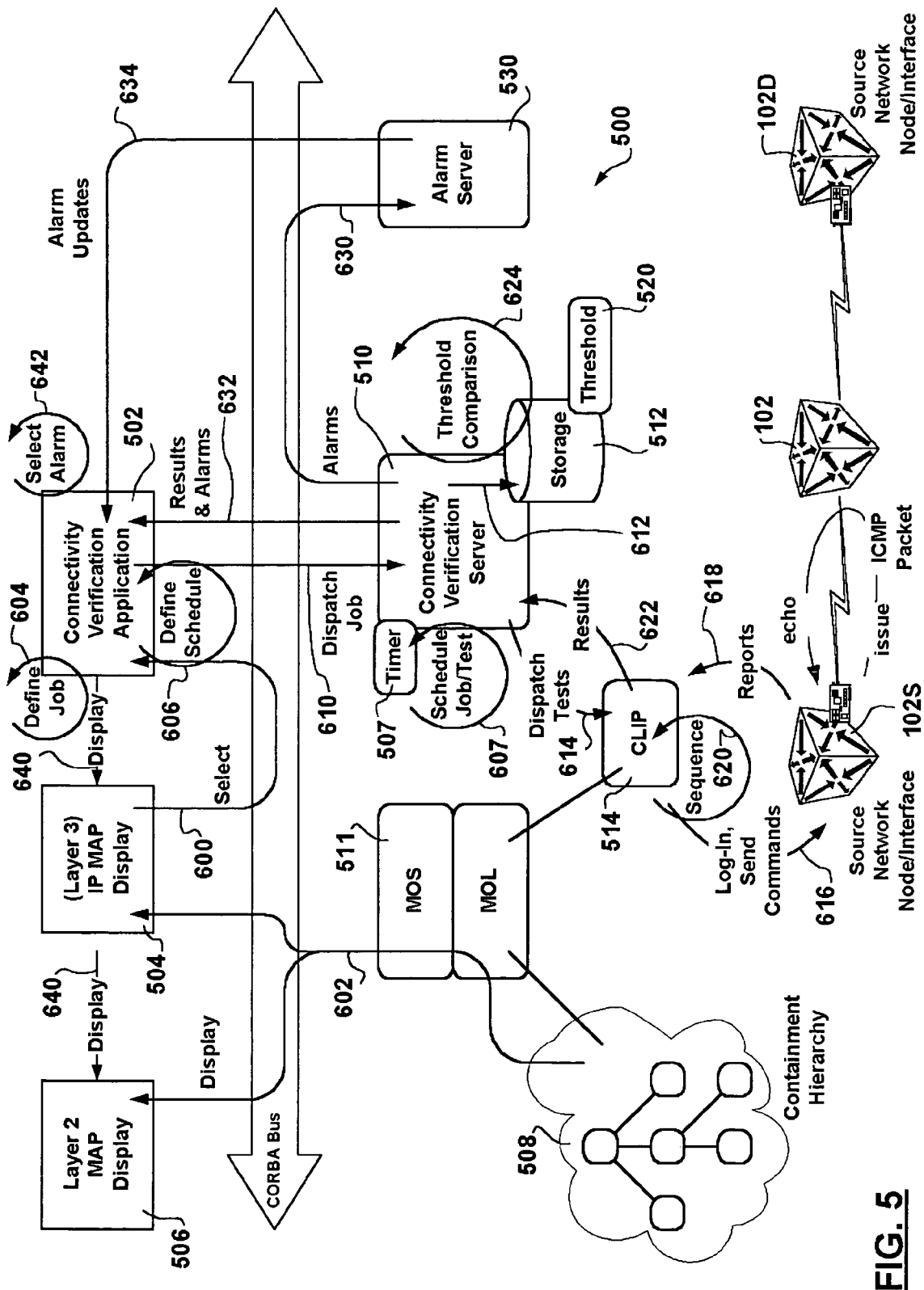
FIG. 5 is a schematic diagram showing elements of a connectivity verification framework in accordance with an exemplary embodiment of the invention.

FIG. 5 shows a connectivity verification framework 500 employed in a centralized communications management context in accordance with an exemplary embodiment of the invention. A connectivity verification application 502 makes use of a network map provided via an IP map application 504 and/or a Layer 2 map application 506 to enable selection 600 of displayed 602 source 102S and destination 102D network nodes from a group of managed network nodes tracked via a containment hierarchy 508 by a Managed Object Server (MOL) 511 of a Network Management System (NMS).

The selected 600 source 102S and destination 104D network nodes are used in defining 604 a connectivity verification job. A schedule may also be defined 606 for the connectivity verification job, although once defined 604 the connectivity verification job may be dispatched 610 for execution immediately. Defining 604 of the connectivity verification job includes specifying connectivity verification parameters including the type and the number of connectivity verification tests to be performed, and optionally specifying thresholds 520 to be applied to connectivity verification results returned (as described herein below).

In accordance with another implementation of the exemplary embodiment of the invention, by specifying (600) a source 102S and destination 102D network node pair, a pair of bi-directional connectivity verification tests is defined.

The NMS system provides a centralized network management views of the managed communications network entities including: routers, IP links, IP interfaces, IP address of unmanaged routers, Label Switched Paths (LSPs), VPNs, etc. In accordance with another implementation of the exemplary embodiment of the invention, Internet Protocol (IP) and Layer-3 source and destination managed entity object instances in the containment hierarchy 508 may be selected (600) from the containment hierarchy 508 itself.

Figure 6:
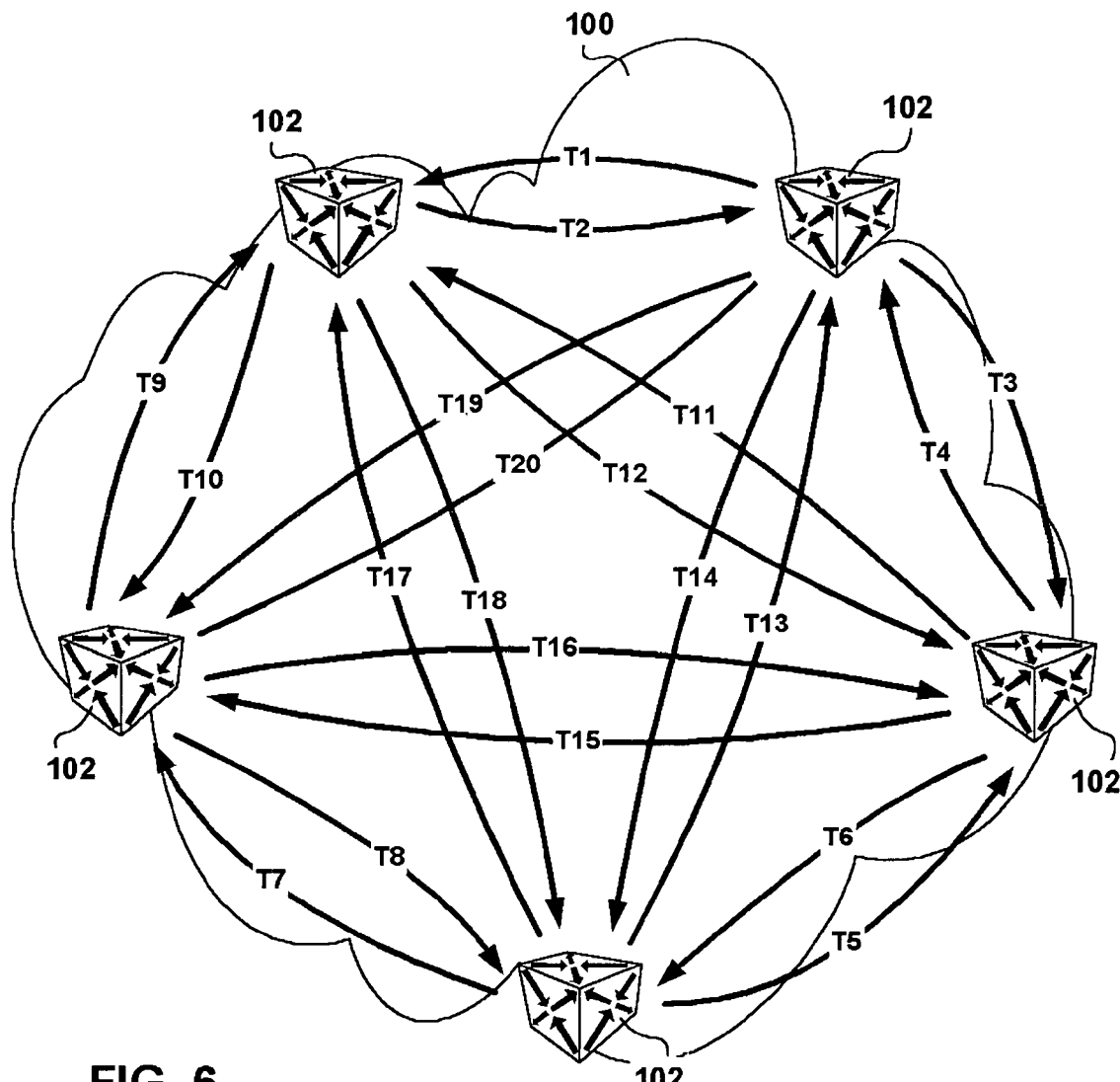
FIG. 6 is a schematic diagram showing network nodes participating in a VPN and a fully meshed bi-directional group of connectivity validation tests to be performed in accordance with the exemplary embodiment of the invention.

By selecting (600) a VPN managed entity, a group of participating network nodes 102 are specified. In accordance with another implementation of the exemplary embodiment of the invention, selecting 600 a group of network node managed entities, fully meshed bi-directional connectivity verification jobs are defined 600 such that corresponding connectivity verification tests are performed between all pairs of network nodes 102 in the selected group. FIG. 6 shows such an exemplary group of five selected network nodes 102 and corresponding bi-directional connectivity verification tests to be performed therebetween regardless whether physical fully meshed interconnecting links are provisioned therebetween (even if physical fully meshed interconnecting link are provisioned packet transport protocols, such as the Spanning Tree Protocol incorporated herein by reference, designate certain physical links as standby links). For clarity, for N network nodes 102 in a selected group, N(N−1)/2 bi-directional connectivity verification jobs are automatically defined 604 to dispatch 614 N(N−1) unidirectional connectivity verification tests between N(N−1)/2 pairs of selected (600) network nodes 102. Operations management personnel is provided with the means to collect the statistics from multiple connectivity verification tests. Therefore, once a managed VPN entity is selected, operation management personnel is provided with the means to easily dispatch 610, via a single click, a VPN connectivity verification job to verify the entire VPN connectivity.

Each connectivity verification job can be dispatched 610 for immediate execution via a connectivity verification server 510 or stored 612 in a repository 512 associated with the connectivity verification server 510 for delayed and/or repeated dispatch 610. The connectivity verification server 510 initiates connectivity verification jobs based on the scheduling information specified in respect thereof. The connectivity verification server 510 queues connectivity verification tests for dispatch 614 via a Command Line Interface Processor (CLIP) 514 at the appropriate time specified in the defined schedule 606 or immediately upon request if the source managed entity (102S) specified in the corresponding connectivity verification test is idle. Scheduled connectivity verification jobs have priority at all times.

The scheduled connectivity verification jobs have the added functionality that allows them to be queued for repeated execution, providing the ability to verify connectivity at specific times, and therefore to generate summary statistics from repeated results obtained in support of determining if customer SLA's are being met or if there is a failure in the communications network.

In accordance with the exemplary embodiment of the invention, a mechanism is provided for scheduling multiple connectivity verification jobs. The connectivity verification server 510 includes a timer 507. The connectivity verification server 510 scans 607 scheduling information (606) specified in respect of queued connectivity verification jobs for connectivity verification tests to be dispatched 614 at specified times.

The CLIP processor 514 takes over the issuing 616 of connectivity verification test commands (typically CLI commands, without limiting the invention thereto) to idle source managed entities (102S), and the retrieval 618 of connectivity verification results in an interaction session in which the CLIP processor 514 logs-on the source managed entity (102S). The CLIP processor 514 therefore provides the means for central collection of connectivity verification test results.

The CLIP processor 514 sequences 620 command issuance so as not to overburden the communications network with ICMP traffic. The CLIP processor 514 does not issue subsequent commands to a managed entity until the last command issued has completed execution (and the results have been retrieved) irrespective of the schedule specified 606 for the connectivity verification job.

Connectivity verification results are provided 622 to the connectivity verification server 510 which may compare 624 the connectivity verification results against thresholds 520 specified in respect of connectivity verification jobs assessing adherence to corresponding SLA agreements. When thresholds 520 are reached, alarms are raised 630 with an alarm server 530. The results and the alarm information may also be propagated 632 to the connectivity verification application 502. The alarm information provided 632 to the connectivity verification application 502 may be subsequently updated 634 by the alarm server 530.

In accordance with another implementation of the exemplary embodiment of the invention, each connectivity verification result is compared against a threshold profile (520) comprising at least two thresholds 520, multiple thresholds being used to implement multiple levels of alarm severity.

Subsequent to providing 632 connectivity verification results to the connectivity verification application 502. The connectivity verification application 502 uses the connectivity verification results and alarm information to display 640 and highlight Layer-2 (506) and Layer-3 (504) objects affected by the alarm. The connectivity verification results may be interacted with 642 to cause the display 640 of Layer-2 and Layer-3 objects associated with a particular connectivity verification job and/or connectivity verification test.

Figure 7:
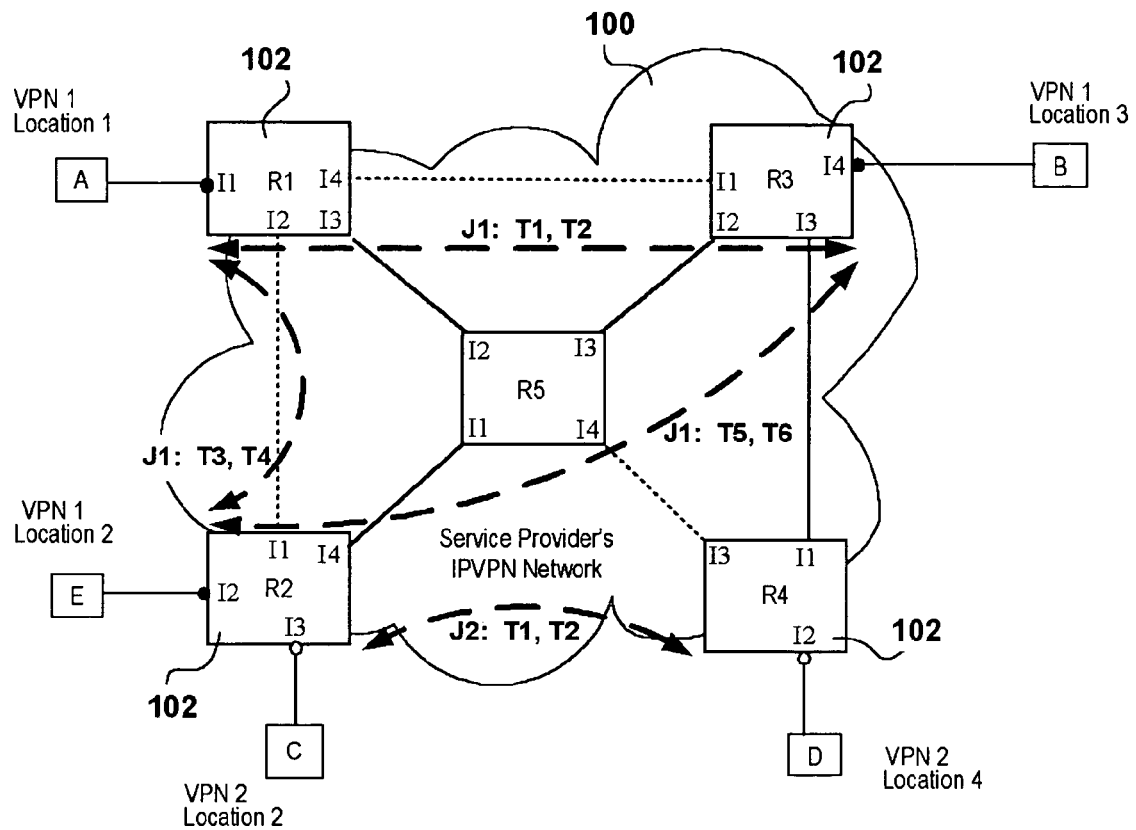
FIG. 7 is a schematic diagram showing connectivity verification performed in accordance with the exemplary embodiment of the invention.

Referring to FIG. 7, according to a use scenario of the exemplary embodiment of the present invention, operation management personnel can easily verify the VPN connectivity shown on the network map. In accordance with the example, only two VPNs 1 and 2 are provisioned. The operations management personnel defines two connectivity verification jobs J1 and J2 by selecting the VPN1 and VPN2 respectively. Selecting VPN1 and VPN2, specifies connectivity verification tests T1, T2, T3, T4, T5, and T6 to be performed between interfaces of routers (102) R1, R2 and R3, and further specifies connectivity verification tests T7, and T8 to be performed between routers (102) R2 and R4, respectively. Subsequent to selecting both connectivity verification jobs J1 and J2, with a single click, operations management personnel dispatches 610 the connectivity verification jobs for immediate execution.

Figure 8:
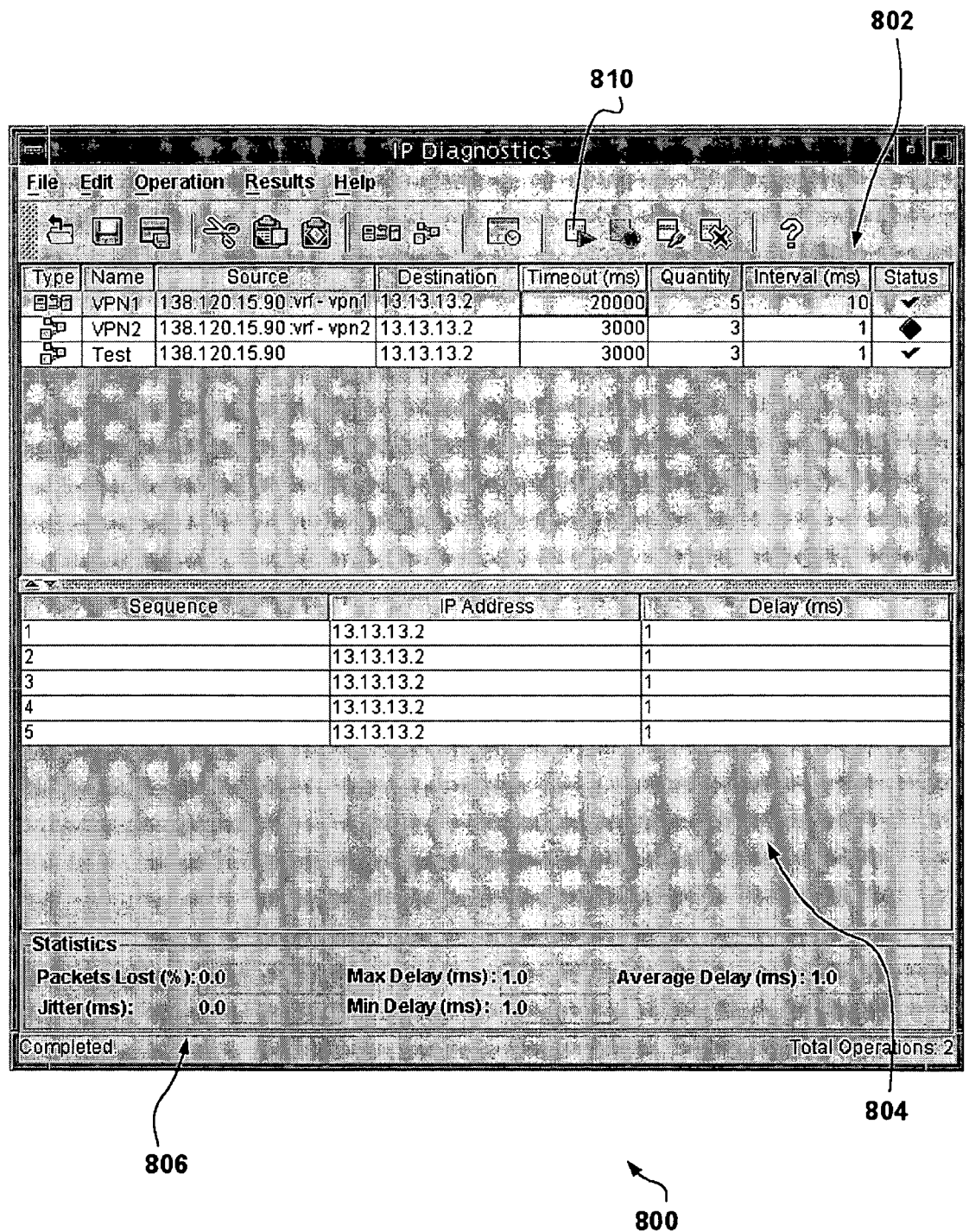
FIG. 8 is a schematic diagram showing a view of a human-machine interface enabling operations management personnel, in accordance with the exemplary embodiment of the invention, to manipulate ping connectivity verification jobs centrally in a network management context.

In accordance with an exemplary implementation of the exemplary embodiment of the invention, FIG. 8 shows an exemplary user interface enabling operations management personnel to manipulate connectivity verification jobs centrally in a network management context.

The connectivity verification job manipulation window 800 is employed in manipulating defined (604) connectivity verification jobs in respect of both types of connectivity verification tests: ping and traceroute.

The connectivity verification job manipulation window 800 contains three areas, a connectivity verification job pane 802, a results pane, and a statistics pane 806. The connectivity verification job pane 802 contains a list of connectivity verification jobs in that have already been defined 604 and/or saved 612 and ready for dispatch.

The following Table 1 describes exemplary connectivity verification job field entries in the connectivity verification job list 802:

TABLE 1

Exemplary connectivity verification job field entries

| Column | Description |
| --- | --- |
| Type | Type of connectivity verification job, ping or traceroute |
| Name (not shown) | name associated to the connectivity verification job |
| Source | Source managed entity from which connectivity verification test(s) are being performed on |
| Destination | corresponding destination managed entity |
| Timeout (ms) | timeout used to wait for a test response from destination |
| Quantity | number of individual tests in the job |
| Interval (sec) | interval between ICMP packets sent |
| Status | status of the connectivity verification job |

Figure 9:
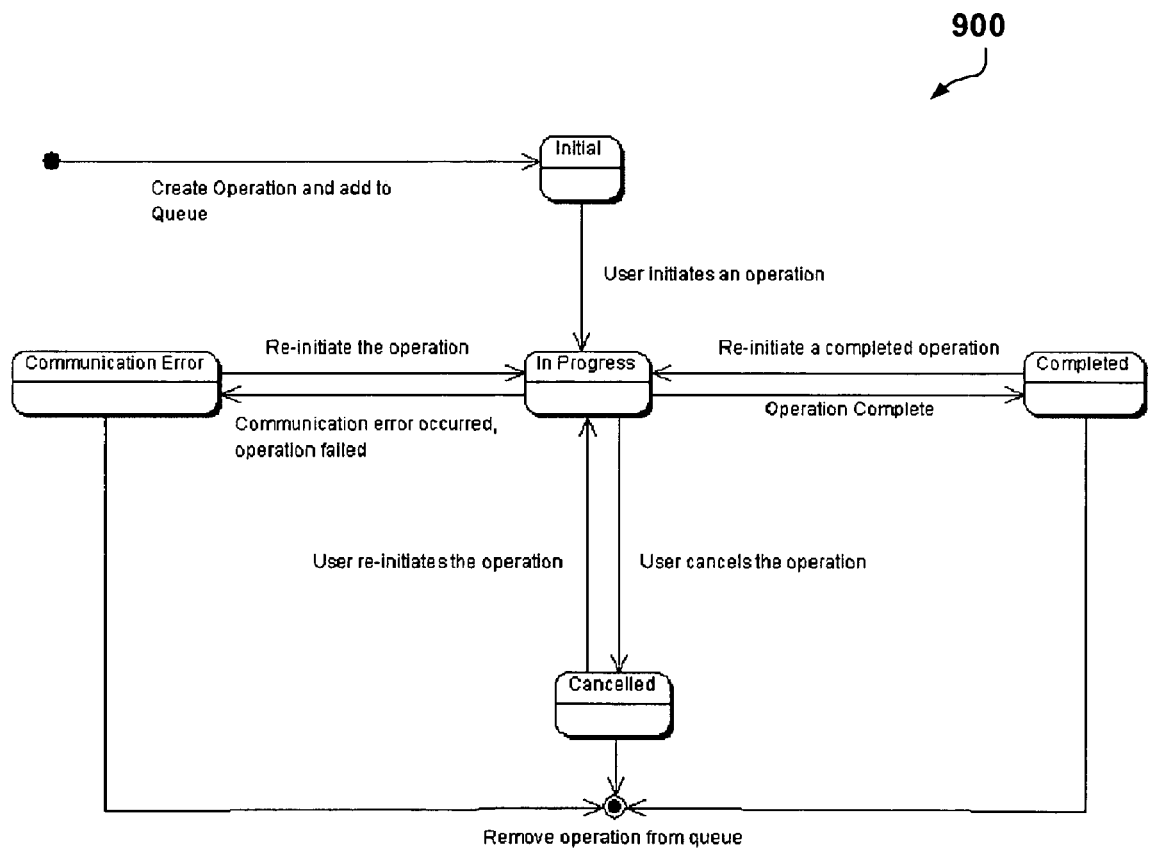
FIG. 9 is a schematic state diagram showing, in accordance with the exemplary embodiment of the invention, connectivity verification job states.

The following Table 2 describes exemplary connectivity verification job states, a corresponding connectivity verification job state diagram 900 is shown in FIG. 9:

TABLE 2

Exemplary connectivity verification job states

Connectivity Verification Job State

Initial - connectivity verification job has just been created/never dispatched
In Progress - connectivity verification job dispatched, no results available yet
Completed - connectivity verification job results have been received
Cancelled - connectivity verification job cancelled, results are unavailable
Error - an error has occurred in respect of the connectivity verification job
Communication Error - a communication error has occurred, job cancelled Depending on the state of the connectivity verification job, only certain actions are available. The "Initial" state of the connectivity verification job only occurs when the connectivity verification job is first added to the connectivity verification job list 802 (or retrieved from a file). Once dispatched 610, the connectivity verification job will stay in the "In Progress" state until either the operations management personnel cancels the connectivity verification job, or the connectivity verification job completes. When the operation enters the "Completed" or "Cancelled" state, the operations management personnel can dispatch the connectivity verification job or delete connectivity verification job from the connectivity verification job list 802. The "Communication Error" state acts exactly as the "Cancelled" state during a server failure. If multiple connectivity verification jobs are queued for the same source managed entity, the state of waiting connectivity verification job(s) will be "In Progress" while the currently running/queued connectivity verification job(s) complete.

The connectivity verification job list 802 will contain all the defined ping and traceroute connectivity verification jobs created and are distinguishable by the "Type" column.

Figure 10:
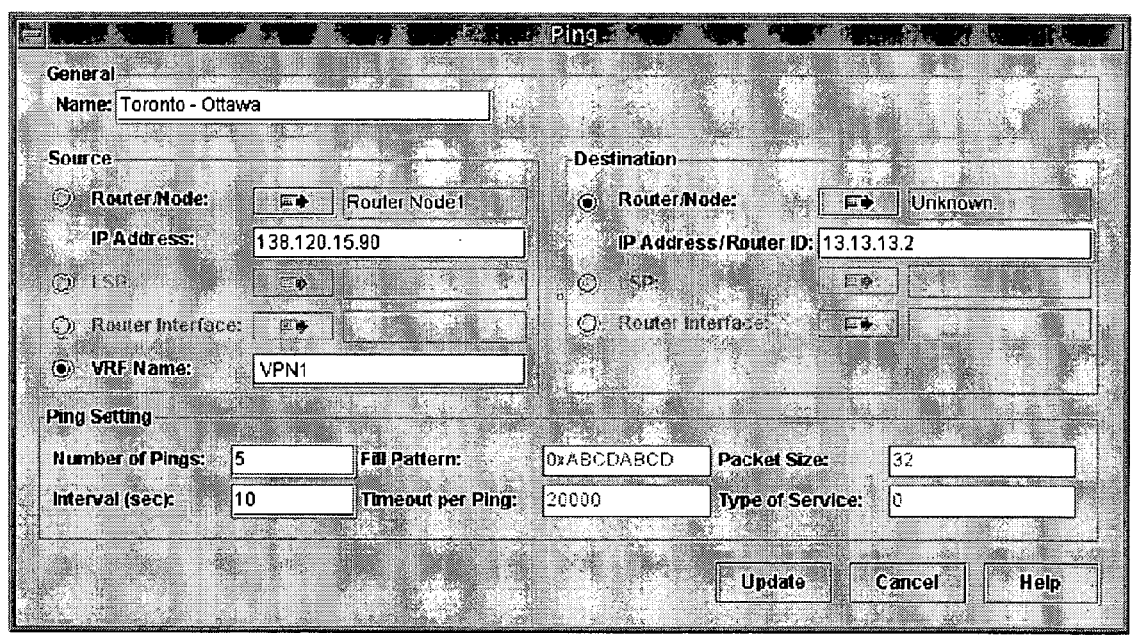
FIG. 10 is a schematic diagram showing a human-machine interface enabling operations management personnel, in accordance with the exemplary embodiment of the invention, to define a ping connectivity verification job.
Figure 11:
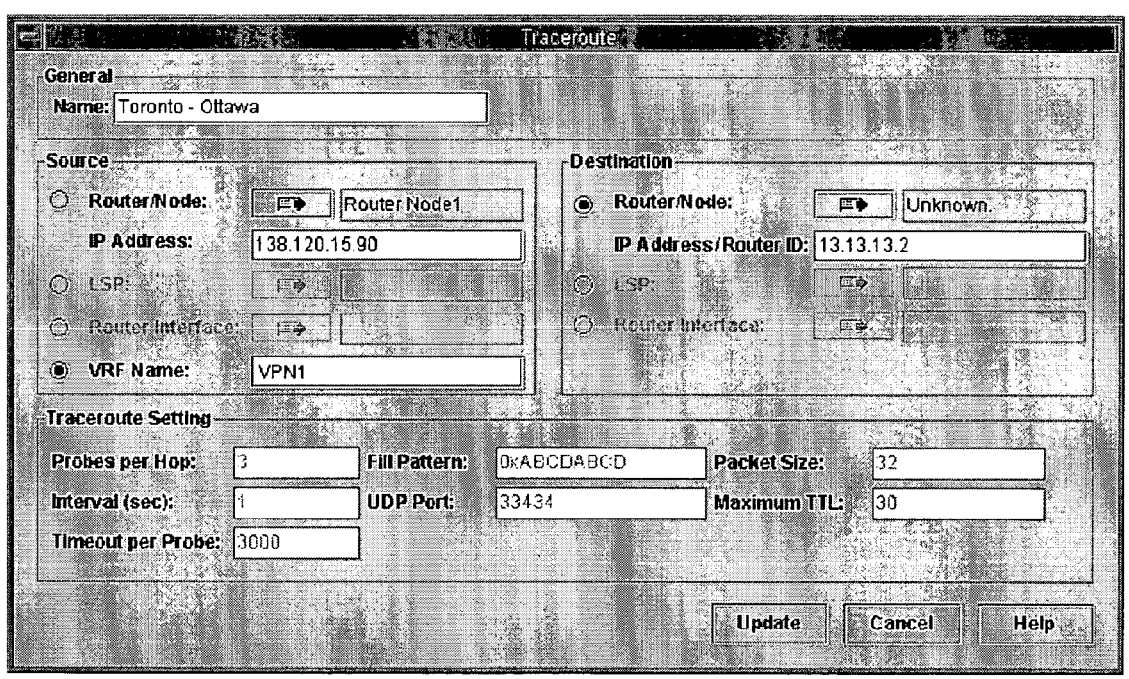
FIG. 11 is a schematic diagram showing a human-machine interface enabling operations management personnel, in accordance with the exemplary embodiment of the invention, to define a traceroute connectivity verification job.

FIG. 10 and FIG. 11 show windows 1000 and 1100 enabling the definition of connectivity verification ping and trace route jobs, respectively. The following Table 3 details exemplary parameters specified for each individual ping connectivity verification job:

TABLE 3

Exemplary ping connectivity verification job parameters

| Field | Description |
| --- | --- |
| Name (not shown) | name for the ping connectivity verification job |
| Source | source managed entity on which the connectivity verification job is executed |
| Destination | Destination managed entity |
| Number of Pings | number of ping probe packets send |
| Interval (sec) | time to wait between the ping probes |
| Packet Size (bytes) | ping probe packet size |
| Fill Pattern | value to pad the ping probe packet with |
| Timeout per Ping (ms) | timeout period to wait for a response |
| Type of Service | type of service (or DSCP bits) |

The following Table 4 details exemplary parameters specified for each individual traceroute connectivity verification job:

TABLE 4

Exemplary traceroute connectivity verification job parameters

| Item | Description |
| --- | --- |
| Name | name for the traceroute connectivity verification job |
| Source | source managed entity on which the connectivity verification job is executed |
| Destination | Destination managed entity |
| Maximum TTL | maximum time to live |
| Probes per Hop | number of pings probes sent to each hop in the route |
| Interval (sec) | Wait period before issuing the next traceroute |
| Packet Size (bytes) | ICMP packet size |
| Fill Pattern | value to pad the ICMP packet with |
| Timeout per Probe (ms) | timeout period to wait for a response |
| UDP Port | port to send the traceroute to |

Both ping and traceroute connectivity verification job have the same valid source and destination managed entities. To specify a router, node or LSP, the user can select it 600 as described above.

Source NMS managed entities include, without limiting the invention: router (router managed by the NMS), first hop LSP (determines the source router), VPN (VRF name), etc. If an LSP is selected, the router and IP address fields are filled with the information from the source endpoint of the LSP including the management IP address of the source router.

Destination NMS managed entities include, without limiting the invention: any IP address (NMS managed router and unmanaged router), routers, router interfaces (numbered and unnumbered (Router ID—string)), LSPs (the destination router being determined as the destination endpoint of the LSP), etc. To specify a destination communications network entity not managed by the NMS, operations management personnel must specify the IP address of the destination entity. If an LSP is selected, the router and IP address fields are filled with the information from the destination endpoint of the LSP.

Selecting a interface, the associated IP address of the source router or node is filled in. If a VRF name is associated to a selected router interface, it will be used to automatically fill in the VRF name.

Another way to specify a router or a node is to query the containment hierarchy 508 based on the management IP address. The operations management personnel can fill in the IP address in the IP address field and then press the "Enter" button. If this is the management IP address of a supported router or node, its particulars are filled in.

All parameters defined for a connectivity verification job applies to all connectivity verification test executed based on that connectivity verification job.

Once the source, destination, and corresponding parameters are specified, the connectivity verification job can then be added to the connectivity verification job list 802 by clicking the "Add" button. The connectivity verification job list 802 can be saved to a file or the repository 512 for retrieval at a later time enabling reuse of defined 604 connectivity verification jobs.

Referring back to FIG. 8, a connectivity verification job added to an operation list does not automatically start the ping or traceroute operation, it must be dispatched 610 by selecting the configuration verification job, right clicking, and selecting "initiate" from a popup menu. The configuration verification job can be cancelled or deleted via the same popup menu.

Selecting multiple connectivity verification jobs enables operations management personnel to dispatch 610 multiple connectivity verification jobs at one time with a single click of a button 810.

To view the results of a connectivity verification job, the connectivity verification job must be "Complete". The results pane 806 is updated upon selecting a completed connectivity verification job from the connectivity verification job list 802. If the selected connectivity verification job is in progress, the results pane 806 will be blank and will automatically updated when the results are received 632.

Figure 12:
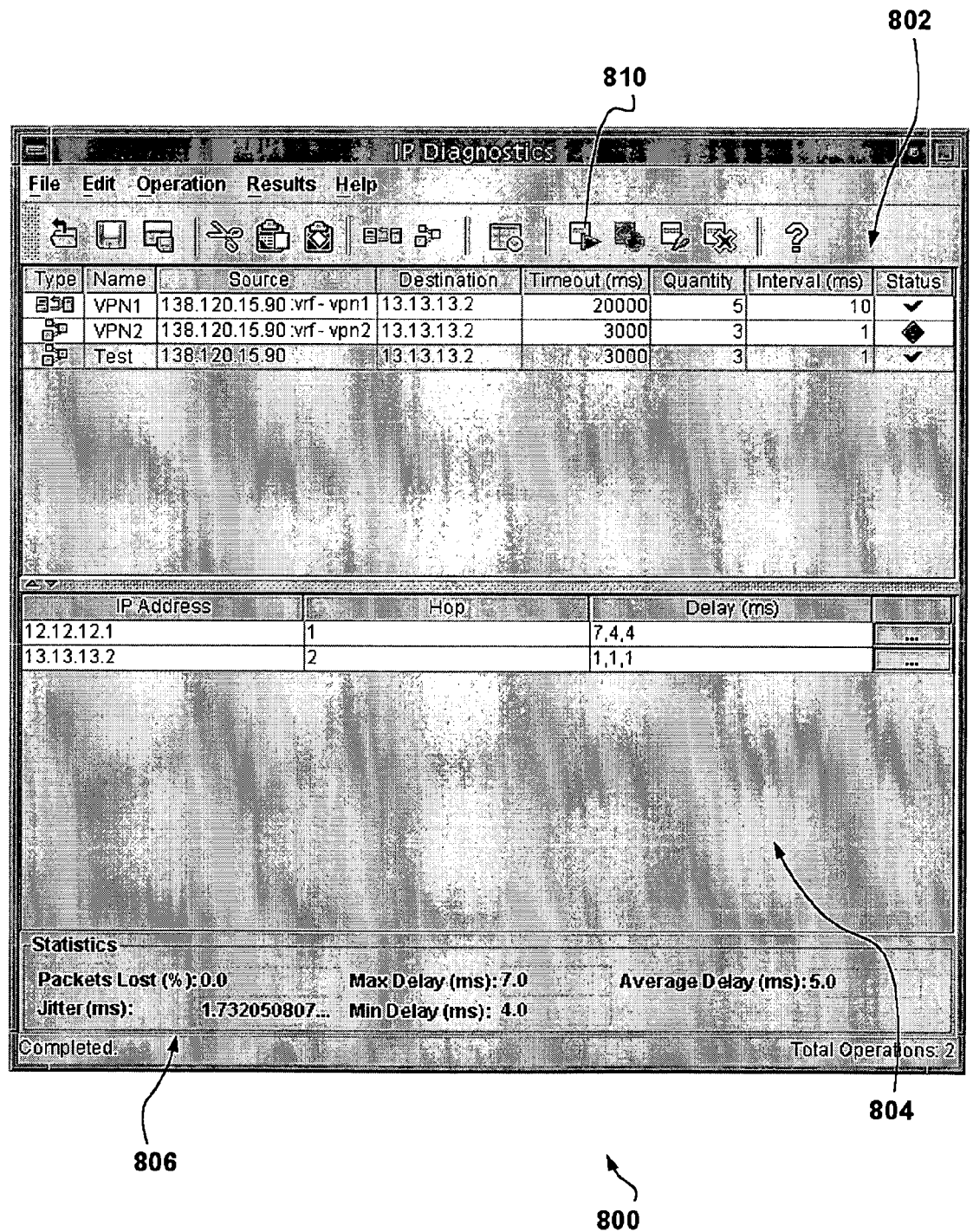
FIG. 12 is a schematic diagram showing another view of the human-machine interface shown in FIG. 8 enabling operations management personnel, in accordance with the exemplary embodiment of the invention, to manipulate traceroute connectivity verification jobs centrally in a network management context.

The results pane 804 displays received 632 results from completed ping or traceroute connectivity verification tests including incurred success status, and delays, from each individual ping or traceroute connectivity verification test. When showing results in respect of a traceroute connectivity verification job, the results pane 804 also shows hop information as shown in FIG. 12.

In accordance with the exemplary embodiment of the invention, operations management personnel is provided with the means to specify that connectivity verification is to be performed periodically.

Figure 13:
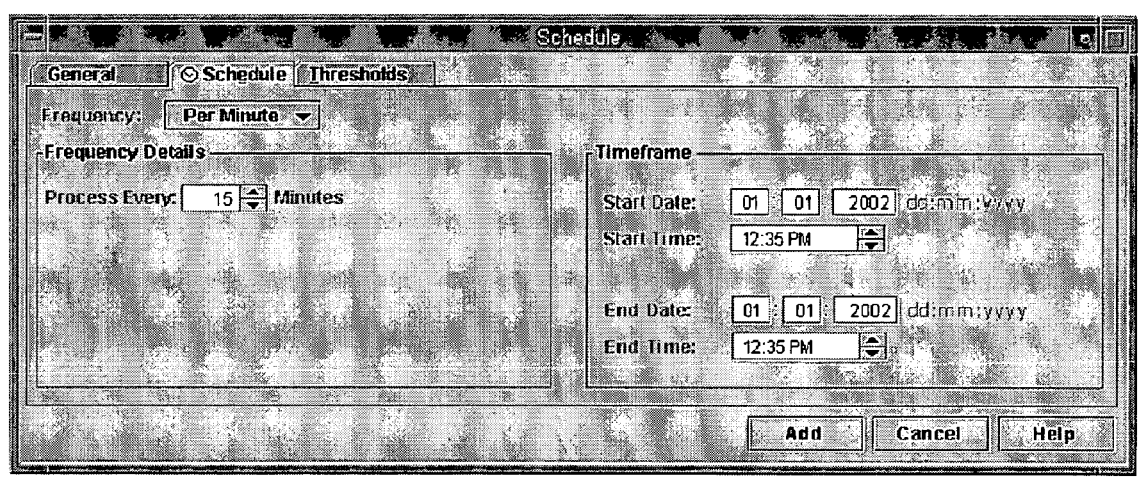
FIG. 13 is a schematic diagram showing, in accordance with the exemplary embodiment of the invention, an exemplary human-machine interface window enabling operations management personnel to define a schedule for a connectivity verification job.

FIG. 13 shows an exemplary window 1300 enabling operations management personnel to define 606 a schedule for a connectivity verification job. Table 5 details exemplary connectivity verification job scheduling parameters:

TABLE 5

Exemplary connectivity verification job scheduling parameters

| Item | Description |
| --- | --- |
| Process Every | The time between each run of the schedule |
| Frequency | The frequency of the connectivity verification job |
| Start Date | The date for this schedule to start running |
| Start Time | The time for this schedule to start running |
| End Date | The date for this schedule to start running |
| End Time | The time for this schedule to start running |

The process every field identifies the time between each run of the schedule itself if a timeframe is not specified. If frequency 0 is specified, the connectivity verification job will be dispatched once at the specified start date/time, the end date/time are ignored.

Connectivity verification schedules may be listed, Table 6 shows exemplary fields for schedule list entries:

TABLE 6

Exemplary schedule list entry fields

| Column | Description |
|---|---|
| Enabled | This is a checkbox to enable or disable each schedule from running |
| Schedule | The unique name of the schedule |
| Start Time | The start time of the schedule |
| End Time | The end time of the schedule |
| Frequency | The time between connectivity verification jobs |
| Freq. Period | The type of frequency (i.e. days, hours, minutes, etc) |
| Alarm Status | Identifies the highest severity alarm that has not been acknowledged |
| Status | The status of the schedule, derived from the highest connectivity verification job status |

The schedule list contains defined 606 schedules identifying each schedule by its unique name. It allows enabling/disabling schedules by clicking the checkbox contained in the "Enabled" field associated to the schedule.

Schedules may overlap which only needs to be addressed when connectivity verification tests have to execute on the same source managed entity. If multiple schedules overlap, the connectivity verification tests from one schedule could be interspersed with connectivity verification tests from another schedule. If a schedule cannot complete within the specified frequency, the next iteration will be skipped.

Returning to FIG. 8/FIG. 12 after an connectivity verification job completes, the operations management personnel may select the completed connectivity verification job and the results are displayed in the result pane 804. The following Table 7 details exemplary results entry fields in respect of completed connectivity verification tests:

TABLE 7

Exemplary completed connectivity verification test results entry fields

| Column | Description |
|---|---|
| IP Address/ Hop | Destination IP Address of the ping probe packets, or the IP address of a Hop for traceroute |
| Sequence | The sequence number of the individual ping or hop |
| Delay (ms) | The delay of the response from the destination |

If an error was encountered by one of the ping probe packets (i.e. valid diagnostics errors such as Network Unreachable or Node Unreachable) the delay column for that individual entry will display the error.

Figure 14:
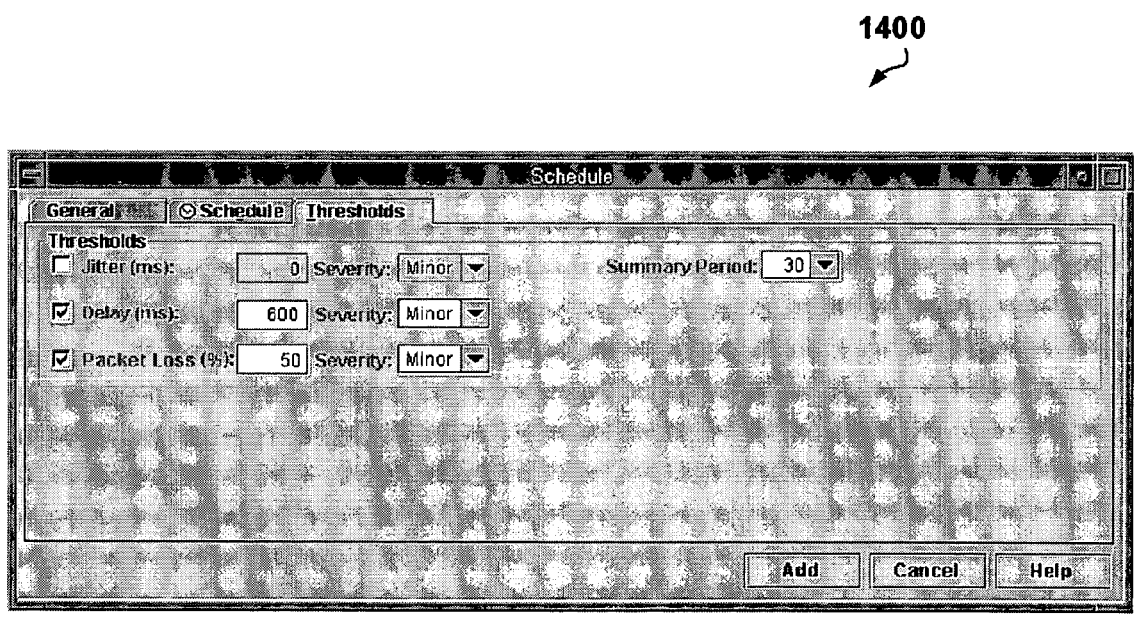
FIG. 14 is a schematic diagram showing, in accordance with the exemplary embodiment of the invention, an exemplary human-machine interface window enabling operations management personnel to define thresholds for a connectivity verification job.

FIG. 14 shows an exemplary window 1400 enabling operations management personnel to define at least one threshold 520 for a connectivity verification job. Table 8 details exemplary connectivity verification job threshold parameters:

TABLE 8

Exemplary connectivity verification job threshold parameters

| Threshold | Item | Values | Description |
|---|---|---|---|
| N/A | Summary Period | 5-1440 | The number of iterations before calculating the summary statistics. |
| Jitter (ms) | Value Severity | 0-60000 Critical Major Minor Warning | The maximum variance in milliseconds before a jitter alarm is raised. A specific severity of alarm can be associated to this threshold value. |
| | (checkbox) | Disabled Enabled | Enables or disables this threshold value. |

TABLE 8-continued

Exemplary connectivity verification job threshold parameters

| Threshold | Item | Values | Description |
|---|---|---|---|
| Delay (ms) | Value Severity | 0-60000 Critical Major Minor Warning | The maximum delay in milliseconds before a round trip delay alarm is raised. A specific severity of alarm can be associated to this threshold value. |
| | (checkbox) | Disabled Enabled | Enables or disables this threshold value. |
| Packet Loss (%) | Value Severity | 0-100 Critical Major Minor Warning | The number of connectivity failures allowed before a connectivity alarm is raised. A specific severity of alarm can be associated to this threshold value. |
| | (checkbox) | Disabled Enabled | Enables or disables this threshold value. |

The summary period field identifies the number of iterations to wait before calculating summary statistics and alarms are raised. If an iteration is skipped, then that iteration will not be included in the summary period. The threshold fields identify the threshold limit and the associated alarm severity to use if an alarm is raised. Setting thresholds for expected connectivity verification test results to trigger alarms when data packet flow requirements are not met, provides monitoring means ensuring adherence to SLA agreements. Table 9 details exemplary alarm levels raised in accordance with specified threshold values:

TABLE 9

Status values for each Operation in the Operation List

Description

Critical Alarm - A critical alarm has been generated
Major Alarm - A Major alarm has been generated
Minor Alarm - A Minor alarm has been generated
Warning Alarm - A warning alarm has been generated
Error - An error has occurred during a summary period
Normal - no errors or alarms Returning to FIG. 8/FIG. 12, the statistics pane 806 displays statistics regarding a connectivity verification job, such as jitter and packet loss percentage. In the case of a traceroute connectivity verification job, the statistics are based on the selected hop in the results pane 804.

The results and statistics can be saved to a local file in one of two formats, text or CSV. The following is exemplary of a text format file:

| Ping New York - Boston | | | |
|---|---|---|---|
| Source 138.120.15.90: vrf - VPN1 Destination 13.13.13.2 | | | |
| Seq | Source | Destination | Delay (ms) |
| 1 | 138.120.15.90 | 13.13.13.2 | 112 |
| 2 | 138.120.15.90 | 13.13.13.2 | Node Unreachable |
| 3 | 138.120.15.90 | 13.13.13.2 | 98 |
| % Loss: 0.0 Jitter (ms): 0.0 min/max/avg (ms): 1.0/1.0/1.0 | | | |

| Traceroute New York - Boston | | |
|---|---|---|
| Source 138.120.15.90: vrf - VPN1 Destination 56.56.56.56 | | |
| Seq | Destination | Delay (ms) |
| 1 | 12.12.12.1 | 10, Node Unreachable, 5 |
| 2 | 13.13.13.2 | 4, 6, 6 |

The following is exemplary of a corresponding CSV format file:

Ping, New York—Boston
Source, 138.120.15.90:vrf—VPN1,Destination, 13.13.13.2
Seq, Source, Destination, Delay (ms)
1, 138.120.15.90, 13.13.13.2,112
2, 138.120.15.90, 13.13.13.2,Node Unreachable
3, 138.120.15.90, 13.13.13.2,98
%Loss (ms),0.0
Jitter (ms),0.0
Min (ms),1.0
Max (ms),1.0
Avg (ms),1.0
Traceroute, New York—Boston
Source,138.120.15.90: vrf—VPN1,Destination, 13.13.13.2
Seq, Destination, Delay (ms)
1,12.12.12.1,10,Node Unreachable,5
2,13.13.13.2,4,6,6

Historical results may be stored in the repository 512 containing results from every ping and traceroute connectivity verification job performed.

Therefore, in accordance with the exemplary embodiment of the invention, verifying connectivity in a service provider IP/MPLS communications network in a network management context using an NMS system is addressed by:

performing directed ping and traceroute connectivity verification tests between specified source and destination managed entities;

performing connectivity verification tests between routers and IP Interfaces;

performing connectivity verification tests via MPLS LSPs;

performing connectivity verification tests within VPNs (VPN Routing and Forwarding (VRF)-VLAN ID labeled VPNs. See RFC 2547 L3VPN incorporated herein by reference.);

performing connectivity verification tests between selected managed entities and unmanaged entities, such as, but not limited to routers; network addressing for unmanaged entities being discovered;

scheduling multiple tests to verify connectivity periodically;

scheduling the multiple tests to obtain for packet traffic statistics (delay, jitter, loss);

configuring alarm thresholds on the multiple connectivity verification test schedule results to ensure service level agreements (SLA) are met; and highlighting failed or successful packet transport routes displayed 640 on the NMS system 504/506.

In conclusion, the connectivity verification framework 500 enables operations management personnel interacting with the connectivity verification application 502 executing on the NMS system 510 in a centralized network management context to gather real-time connectivity information from a managed communications network for maintenance and diagnostics purposes.

Advantages provided by the proposed solution include:

A simple solution to implement on a Network Management System because provisioning of the connectivity verification tests are centralized and do not require manual logging-on the particular source managed entities.

The solution provides schedule connectivity verification testing to be executed periodically, which saves operations management personnel time, thereby reducing a service provider's operating costs.

The solution increases the reliability, availability and serviceability of the IP connectivity by providing immediate alarms and results to be summarize for later analysis.

The solution enhances and simplifies the IP diagnostics and maintenance capability for solving service provider network problems. It also allows testing network provisioning prior to enabling a data service.

Because the management is done through a GUI associated with the NMS system, the configuration is much easier than using the legacy CLI on a per source network node (router) basis, which is error prone.

A further advantage includes being able to view/configure/modify/store the multiple network connectivity verification tests and provide the resulting information immediately (through views or alarms) or historically in a network management context.

Reducing operating expenditures is important to service providers. The invention automates the diagnostics process of creating and maintaining connectivity tests, thereby reducing the operating costs of carrying out maintenance and diagnosis functions ensuring that IP connectivity meets the customer expectations as far a jitter, delay and loss of data. Furthermore, operating costs are reduced and reliability is increased, both of which are valuable to service providers.

The embodiments presented are exemplary only and persons skilled in the art would appreciate that variations to the above described embodiments may be made without departing from the spirit of the invention. The scope of the invention is solely defined by the appended claims.

We claim:

1. A network management connectivity verification framework comprising:

a connectivity verification server to perform unattended connectivity verification jobs; and a connectivity verification application to:

define connectivity verification jobs capable of verifying connectivity in the network relating to at least Layer-2 and Layer-3 objects within a given containment hierarchy for the network, control the connectivity verification server to perform the defined connectivity verification jobs, wherein the performing generates at least one of connectivity verification results, display the connectivity verification results, receive a user-input specification of a connectivity verification threshold, compare the connectivity verification results to the specified connectivity verification threshold, generate an alarm when the comparison shows that at least one of the connectivity verification results has reached the specified connectivity verification threshold, identify Layer-2 and Layer-3 objects within the containment hierarchy affected by the connectivity verification results associated with the alarm, and display the identified Layer-2 and Layer-3 objects.

2. The connectivity verification framework of claim 1, wherein the connectivity verification jobs are scheduled and the connectivity verification server performs scheduled connectivity verification.

3. The connectivity verification framework of claim 1, wherein the connectivity verification application further provides a display of the connectivity verification results.

4. The connectivity verification framework of claim 3, wherein the connectivity verification results, including alarm information, are further used to generate a network map displaying selected connectivity verification results.

5. The connectivity verification framework of claim 1, wherein the results of each connectivity verification job are compared against a connectivity profile, a deviation from the connectivity profile being used to raise the alarm.

6. A method implemented at least in part by a connectivity verification server for creating a network connectivity verification test, comprising the following steps:
   defining a connectivity verification job capable of verifying connectivity in the network relating to at least Layer-2 and Layer-3 objects within a given containment hierarchy for the network;
   controlling the connectivity verification server to perform the connectivity verification job wherein the performing generates at least one of connectivity verification results;
   displaying the connectivity verification results;
   receiving a user-input specification of a connectivity verification threshold;
   comparing the connectivity verification results to the specified connectivity verification threshold;
   generating an alarm when the comparison shows that at least one of the connectivity verification results has reached the specified connectivity verification threshold;
   identifying Layer-2 and Layer-3 objects within the containment hierarchy affected by the connectivity verification results associated with the alarm; and
   displaying the identified Layer-2 and Layer-3 objects.

7. The method of creating the network connectivity verification test of claim 6, wherein defining the connectivity verification job further comprises the following steps:
   selecting via an NMS user interface, a pair of source and destination IP objects between which connectivity is to be verified; and
   specifying a connectivity verification schedule.

8. The method of creating the network connectivity verification test of claim 7,
   wherein the step of selecting IP objects selects IP objects from a group comprising at least one of a router, an IP interface, and an IP address.

9. The method of creating the network connectivity verification test of claim 7,
   wherein the step of selecting IP objects selects pairs of IP objects from a group comprising at least one of an Internet Protocol (IP) link, a Label Switched Path (LSP), and a Virtual Private Network (VPN).

10. The method of creating the network connectivity verification test of claim 6, wherein the step of receiving a user-input specification further comprises the step of specifying a threshold for at least one of round trip delay, jitter, and packet loss.

11. The method of creating the network connectivity verification test of claim 6,
    wherein the step of defining the connectivity verification job further comprises the following step:
    configuring a connectivity verification parameter from a group comprising at least one of a number of ping commands to issue, a ping packet size, a ping data fill pattern, a time to wait for response, and a type of service.

12. The method of creating the network connectivity verification test of claim 6,
    wherein the step of defining the connectivity verification job further comprises the following step:
    configuring a connectivity verification parameter from a group comprising at least one of a number of traceroute commands to issue, a traceroute packet size, a traceroute packet data fill pattern, a time to wait for response, and a type of service.

13. A method implemented at least in part by a connectivity verification server for performing a network connectivity verification test in a network management context comprising the following steps:
    scheduling a connectivity verification process, the process capable of verifying connectivity in the network relating to at least Layer-2 and Layer-3 objects within a given containment hierarchy for the network;
    receiving a user-input specification of a connectivity verification threshold;
    performing the scheduled connectivity verification process to generate a connectivity verification result;
    comparing the connectivity verification result with the user-specified connectivity verification threshold;
    generating an alarm when the comparison shows that the connectivity verification result has reached the specified connectivity verification threshold;
    identifying Layer-2 and Layer-3 objects within the containment hierarchy affected by the connectivity verification result associated with the alarm; and
    displaying the identified Layer-2 and Layer-3 objects.

14. The method of performing the network connectivity verification test of claim 13, further comprising the following step:
    storing a connectivity verification job on a computer readable medium for subsequent access and execution.

15. The method of performing the network connectivity verification test of claim 14, further comprising the following step:
    displaying at least one IP object based on one of the connectivity verification job and the connectivity verification result.

16. The method of performing the network connectivity verification test of claim 15,
    wherein the displayed object is one of an OSI Layer 2 and an OSI Layer 3 object.

17. The method of performing the network connectivity verification test of claim 13,
    wherein the step of performing scheduled connectivity verification further comprises the following step:
    periodically executing connectivity verification tests.

18. The method of performing the network connectivity verification test of claim 13,
    wherein the step of performing scheduled connectivity verification further comprises the following step:
    issuing at least one of a ping command and a traceroute command.

19. The method of performing the network connectivity verification test of claim 13, further comprising the following step:
    storing historical connectivity verification results on a computer readable medium for subsequent access.

* * * * *